(12) United States Patent
McAdam (10) Patent No.: US 9,018,935 B2
(45) Date of Patent: Apr. 28, 2015

(54) METHOD FOR OPERATING A METAL DETECTION APPARATUS AND APPARATUS

(75) Inventor: Stephen McAdam, Warrington (GB)

(73) Assignee: Mettler-Toledo Safeline Limited, Manchester (GB)

( * ) Notice: Subject to any disclaimer, the term of this patent is extended or adjusted under 35 U.S.C. 154(b) by 816 days.

(21) Appl. No.: 13/236,275

(22) Filed: Sep. 19, 2011

(65) Prior Publication Data

US 2013/0069620 A1 Mar. 21, 2013

(51) Int. Cl.
*G01R 19/00* (2006.01)
*G01V 3/10* (2006.01)

(52) U.S. Cl.
CPC .......................... *G01V 3/104* (2013.01)

(58) Field of Classification Search
USPC ............ 324/66–67, 258, 260, 200, 239, 228, 324/329; 340/551, 568.1, 572.7, 686.6
See application file for complete search history.

(56) References Cited

U.S. PATENT DOCUMENTS

| | | |
|---|---|---|
| 2,598,252 A | 5/1952 | Gossick |
| 3,617,866 A | 11/1971 | Dowsett et al. |
| 3,721,821 A | 3/1973 | Blanyer |
| 3,758,849 A | 9/1973 | Susman et al. |
| 3,896,608 A | 7/1975 | Garrott |
| 4,176,555 A | 12/1979 | Dorman |
| 4,263,551 A | 4/1981 | Gregory et al. |
| 4,300,097 A | 11/1981 | Turner |
| 4,451,812 A | 5/1984 | Vescovi et al. |
| 4,563,644 A | 1/1986 | Lenander et al. |
| 4,800,477 A | 1/1989 | Esposito |
| 4,837,511 A | 6/1989 | Whittington et al. |
| 4,843,324 A | 6/1989 | Humphreys, Jr. et al. |
| 4,965,522 A | 10/1990 | Hazen et al. |
| 5,003,271 A | 3/1991 | Swanson |
| 5,034,689 A | 7/1991 | Inoue et al. |

(Continued)

FOREIGN PATENT DOCUMENTS

| | | |
|---|---|---|
| DE | 3406736 A1 | 8/1985 |
| DE | 3713363 A1 | 11/1988 |

(Continued)

OTHER PUBLICATIONS

Abbas, H.J. et al., The detection and location of foreign metal objects in conveyed products, Trans Inst M C., Apr.-Jun. 1986, pp. 76-84, 8(2).

(Continued)

*Primary Examiner* — Melissa Koval
*Assistant Examiner* — Trung Nguyen
(74) *Attorney, Agent, or Firm* — Standley Law Group LLP (57) ABSTRACT

A method for operating a metal detection apparatus that comprises a transmitter unit with a drive circuit that alternately applies two different drive voltages via a first set of two drive switches to a first tail and via a second set of two drive switches to a second tail of a transmitter coil that is coupled to a receiver coil, which is connected to the input of a receiver unit. A system adapted to operate according to an exemplary method is also provided. In one embodiment, at least a first waveform is generated for controlling the first set of drive switches and at least a second waveform is generated for controlling the second set of drive switches, wherein the first and second waveforms that correspond to a selected operating frequency are shifted relative to one another in order to allow a desired drive current to flow through the transmitter coil.

20 Claims, 5 Drawing Sheets

(56) References Cited

U.S. PATENT DOCUMENTS

| | | | |
|---|---|---|---|
| 5,068,612 | A | 11/1991 | Auslander et al. |
| 5,264,733 | A | 11/1993 | Tigges |
| 5,304,927 | A | 4/1994 | Thomas et al. |
| 5,345,160 | A | 9/1994 | Corniere |
| 5,386,182 | A | 1/1995 | Nikami |
| 5,572,121 | A | 11/1996 | Beswick |
| 5,642,050 | A | 6/1997 | Shoemaker |
| 5,650,726 | A | 7/1997 | Gasnier et al. |
| 5,729,143 | A | 3/1998 | Tavernetti et al. |
| RE35,806 | E | 5/1998 | Rossi et al. |
| 5,859,533 | A | 1/1999 | Gasnier et al. |
| 5,929,634 | A | 7/1999 | Artinger |
| 5,969,528 | A | 10/1999 | Weaver |
| 5,994,897 | A | 11/1999 | King |
| 6,025,711 | A * | 2/2000 | Demma et al. ........... 324/207.26 |
| 6,037,870 | A | 3/2000 | Alessandro |
| 6,094,079 | A | 7/2000 | Boggs et al. |
| 6,118,337 | A | 9/2000 | Schweighofer |
| 6,130,489 | A | 10/2000 | Heimlicher |
| 6,157,190 | A | 12/2000 | Nagaishi et al. |
| 6,177,792 | B1 | 1/2001 | Govari et al. |
| 6,236,200 | B1 | 5/2001 | Nekado et al. |
| 6,337,566 | B1 | 1/2002 | Fujisaki et al. |
| 6,420,866 | B1 | 7/2002 | Goldberg et al. |
| 6,437,573 | B1 | 8/2002 | Golder et al. |
| 6,724,191 | B1 | 4/2004 | Larsen |
| 6,958,603 | B2 | 10/2005 | Kondo |
| 7,102,347 | B2 | 9/2006 | Kondo |
| 7,663,361 | B2 | 2/2010 | Nishio et al. |
| 8,278,918 | B2 * | 10/2012 | McAdam ...................... 324/239 |
| 8,587,301 | B2 * | 11/2013 | Derungs ...................... 324/258 |
| 2002/0093338 | A1 | 7/2002 | Rowan |
| 2003/0117270 | A1 | 6/2003 | Dimmer et al. |
| 2003/0141866 | A1 | 7/2003 | Johnson et al. |
| 2003/0164766 | A1 | 9/2003 | Britton |
| 2004/0046550 | A1 | 3/2004 | Kondo |
| 2005/0104594 | A1 | 5/2005 | Nelson et al. |
| 2006/0006872 | A1 | 1/2006 | Nelson |
| 2006/0226833 | A1 | 10/2006 | Kubotera et al. |

FOREIGN PATENT DOCUMENTS

| | | | |
|---|---|---|---|
| DE | 4424058 | C1 | 10/1995 |
| DE | 202004011073 | U1 | 11/2004 |
| EP | 0124042 | A2 | 11/1984 |
| EP | 0215244 | A2 | 3/1987 |
| EP | 0281014 | A2 | 9/1988 |
| EP | 0368762 | A2 | 5/1990 |
| EP | 0369954 | A1 | 5/1990 |
| EP | 0379804 | A2 | 8/1990 |
| EP | 0780764 | A2 | 6/1997 |
| EP | 0782012 | A2 | 7/1997 |
| EP | 1202077 | A2 | 5/2002 |
| EP | 1502544 | A1 | 2/2005 |
| GB | 400041 | | 1/1933 |
| GB | 528568 | | 2/1939 |
| GB | 677773 | | 8/1952 |
| GB | 776163 | | 6/1957 |
| GB | 819893 | | 9/1959 |
| GB | 1436900 | | 5/1976 |
| GB | 2004069 | A | 3/1979 |
| GB | 2025630 | A | 1/1980 |
| GB | 2026169 | A | 1/1980 |
| GB | 1603578 | | 11/1981 |
| GB | 2204133 | A | 11/1988 |
| GB | 2372329 | A | 8/2002 |
| GB | 2423366 | A | 8/2006 |
| GB | 2462212 | A | 2/2010 |
| JP | 53-142260 | A | 12/1978 |
| JP | 57-133373 | A | 8/1982 |
| JP | 57-187649 | A | 11/1982 |
| JP | 57-187650 | A | 11/1982 |
| JP | 59-40287 | A | 3/1984 |
| JP | 59-48673 | A | 3/1984 |
| JP | 59-60274 | A | 4/1984 |
| JP | 59-60277 | A | 4/1984 |
| JP | 60-178318 | A | 9/1985 |
| JP | 60-225084 | A | 11/1985 |
| JP | 1-176972 | A | 7/1989 |
| JP | 3-218490 | A | 9/1991 |
| JP | 9-80162 | A | 3/1997 |
| JP | 10-111363 | A | 4/1998 |
| JP | 11-337656 | A | 12/1999 |
| JP | 2000-56032 | A | 2/2000 |
| JP | 2001-91661 | A | 4/2001 |
| JP | 2001-91663 | A | 4/2001 |
| JP | 2002-168965 | A | 6/2002 |
| JP | 2002-333485 | A | 11/2002 |
| JP | 2004-205319 | A | 7/2004 |
| JP | 2004-251712 | A | 9/2004 |
| WO | 87/04801 | A1 | 8/1987 |
| WO | 88/03273 | A1 | 5/1988 |
| WO | 97/36143 | A1 | 10/1997 |
| WO | 02/25318 | A1 | 3/2002 |
| WO | 2006/087510 | A1 | 8/2006 |
| WO | 2008/006178 | A1 | 1/2008 |

OTHER PUBLICATIONS

Asakawa, K. et al., Metal Detector for Tracing Submarine Telecommunication Cables, IEEE Transactions on Instrumentation and Measurement, Dec. 1983, pp. 477-483, IM-32(4).

Dairy Foods, Buyers Mart: Plant Equipment, web pages from www.dairyfoods.com, 2010, 6 pages, BNP Media.

Brown, J., Brief H-Bridge Theory of Operation, Tutorials, 2011, 4 pages, Dallas Personal Robotics Group.

CEIA, Industrial Metal Detector THS, Oct. 31, 2000, 96 pages, CEIA S.p.A., Italy.

CEIA, Industrial Metal Detector THS, Dec. 5, 2001, 97 pages, CEIA S.p.A., Italy.

CEIA, Industrial Metal Detector, Apr. 2002, 40 pages, CEIA S.p.A., Italy.

Cintex Ltd., Foodex Meatex 2004, Entrepreneur Food Trade Review, Feb. 2004, 2 pages, Food Trade Press Ltd. and Gale Group.

Dairy Field, Variable-frequency metal detector, web pages from www.allbusiness.com, Jan. 1, 2005, 2 pages, AllBusiness.com, Inc.

Flind, A., Magnum Metal Locator, Practical Electronics, 1980, pp. 1-11, Wimbourne Publishing.

Flind, A., Magnum Metal Locator Part 3, Practical Electronics, 1981, pp. 1-22, Wimbourne Publishing.

Funkschau, Metallsuchgerate, Funkschau, Jul. 10, 1981, pp. 50-54, 14.

Gray, J., Development of an advanced industrial metal detector instrumentation, Computing & Control Engineering Journal, Jun. 1994, pp. 117-120, 5(3).

Hamo, D.J., A 50W, 500kHz, Full-Bridge, Phase-Shift, ZVS Isolated DC to DC Converter Using the HIP4081A, Intersil Intelligent Power, Apr. 1995, pp. 1-16, AN9506.

Loma Systems, Inc., Loma Launches Cintex Brand Sentry VF, First-Ever, Variable Frequency Metal Detector, web page from www.beverageonline.com, Nov. 16, 2004, 1 page, VertMarkets, Inc.

Nelson, C.V. et al., Wide Bandwidth Time-Domain Electromagnetic Sensor for Metal Target Classification, IEEE Transactions on Geoscience and Remote Sensing, Jun. 2001, pp. 1129-1138, 39(6).

Heat and Control, CEIA THS/3F Metal Detector Product Information Sheet, web page from www.heatandcontrol.com, 2006, 1 page, Heat and Control, Inc.

wattagnet.com, Mettler-Toledo Safeline Profile metal detection systems, web pages from www.wattagnet.com, printed Feb. 23, 2011, 2 pages.

packworld.com, Cintex Sentry VF variable frequency metal detector, web page from www.packworld.com, Nov. 2004, 1 page.

Brand protection looks to Tailored solutions from inspection systems, Machinery Update, Mar./Apr. 2004, pp. 85-90.

Kittel, C.F. et al., Metal Detector, U.S. Appl. No. 11/883,950, international filing date Jan. 9, 2006, 49 pages.

* cited by examiner

METHOD FOR OPERATING A METAL DETECTION APPARATUS AND APPARATUS

BACKGROUND AND SUMMARY OF THE INVENTION

Exemplary embodiments of the present invention relate to a method for operating a metal detection apparatus and to a metal detection apparatus operating according to this method.

A metal detection apparatus may be used to detect metal contamination in edible goods and other products. As described in WO 02/25318, modern metal apparatuses utilize a search head comprising a "balanced coil system" that is capable of detecting all metal contaminant types including ferrous, nonferrous, and stainless steels in a large variety of products such as fresh and frozen products.

A metal detection apparatus that operates according to the "balanced coil" principle typically comprises three coils that are wound onto a non-metallic frame, each exactly parallel with the other. In a typical system, the transmitter coil located in the center is energized with a high frequency electric current that generates a magnetic field. The two coils on each side of the transmitter coil act as receiver coils. Since the two receiver coils are identical and installed the same distance from the transmitter coil, an identical voltage is induced in each of them. In order to receive an output signal that is zero when the system is in balance, the first receiver coil is connected in series with the second receiver coil having an inverse winding. Hence the voltages induced in the receiver coils, that are of identical amplitude and inverse polarity, cancel out one another in the event that the system, in the absence of metal contamination, is in balance.

As a particle of metal passes through the coil arrangement, the high frequency field is disturbed first near one receiver coil and then near the other receiver coil. While the particle of metal is conveyed through the receiver coils, the voltage induced in each receiver coil is changed typically in the range of Nano-volts. This change in balance results in a signal at the output of the receiver coils that can be processed, amplified, and subsequently be used to detect the presence of the metal contamination in a product.

In a typical system, the signal processing channels split the received signal into two separate components that are 90° apart from one another. The resultant vector has a magnitude and a phase angle, which is typical for the products and the contaminants that are conveyed through the coils. In order to identify a metal contaminant, "product effects" need to be removed or reduced. If the phase of the product is known, then the corresponding signal vector can be reduced. Eliminating unwanted signals from the signal spectrum thus leads to higher sensitivity for signals originating from contaminants.

Methods applied for eliminating unwanted signals from the signal spectrum therefore exploit the fact that the contaminants, the product, and other materials, have different influences on the magnetic field so that the resulting signals differ in phase.

The signals caused by various metals or products, as they pass through the coils of the metal detection apparatus, can be split into two components, namely resistive and reactive components, according to the conductivity and magnetic permeability of the measured object. For example, the signal caused by ferrite is primarily reactive, while the signal from stainless steel is primarily resistive. Products that are conductive typically cause signals with a strong resistive component.

Distinguishing between the phases of the signal components of different origin by means of a phase detector allows obtaining information about the product and the contaminants. A phase detector, e.g., a frequency mixer or analog multiplier circuit, generates a voltage signal that represents the difference in phase between the signal input, such as the signal from the receiver coils, and a reference signal provided by the transmitter unit to the receiver unit. Hence, by selecting the phase of the reference signal to coincide with the phase of the product signal component, a phase difference and a corresponding product signal is obtained at the output of the phase detector that is zero. In the event that the phase of the signal components that originate from the contaminants differ from the phase of the product signal component, then the signal components of the contaminants may be detected. However in the event that the phase of the signal components of the contaminants is close to the phase of the product signal component, then the detection of contaminants fails, since the signal components of the contaminants are suppressed together with the product signal component.

In known systems, the transmitter frequency is therefore selectable in such a way that the phase of the signal components of the metal contaminants will be out of phase with the product signal component.

GB2423366A discloses a metal detection apparatus that is designed to switch between at least two different operating frequencies such that any metal particle in a product will be subject to scanning at different frequencies. The frequency of operation is rapidly changed so that any metal particle passing through on a conveyor belt will be scanned at two or more different frequencies. In the event that for a first operating frequency the signal component caused by a metal particle is close to the phase of the signal component of the product and thus masked, then it is assumed that for a second frequency, the phase of the signal component caused by the metal particle will differ from the phase of the signal component of the product so that the signal components may be distinguished. By switching between many frequencies, it is expected that one frequency will provide a suitable sensitivity for any particular metal type, size, and orientation.

The drive circuit of the transmitter disclosed in GB2423366A comprises an electronically programmable logic device and a driver connected to four field effect transistors, which form a full wave bridge circuit with the transmitter coil connected across. For a particular coil system, a plurality of drive maps is stored in the electronically programmable logic device, each containing a switching sequence for the switches for a respective predetermined frequency of operation of the apparatus. With the help of stored look-up tables, the microprocessor can then select an appropriate map depending on the selected frequency of operation.

Storing, updating, and selecting appropriate drive maps for a particular coil system requires considerable efforts that increase with the number of operating frequencies. The process of adapting and optimising the system for a specific application requires updating and enhancing the drive maps. In the event that the user changes the products to be tested and expects the appearance of metal contaminants that differ in sort and dimension from contaminants measured with the previous application, a laborious optimization process needs to be performed.

GB2462212B also refers to a metal detector that contains a drive circuit comprising four switches arranged as a full bridge circuit, wherein the coil system is connected across the output of the bridge. A programmable logic device controls the switches via a plurality of drive maps stored in the programmable logic device, with each drive map containing a switching sequence for a respective predetermined frequency of operation.

Also known in the art are metal detectors such as described in U.S. Pat. No. 6,724,191 B1, to Larsen, which discloses various circuits including an H-bridge switch network and a pulse width modulated switched capacitor resonator, for simultaneously resonating at several frequencies.

U.S. Pat. No. 5,859,533 to Gasnier describes an electromagnetic tomographic emitter for operating at variable frequencies to detect subsurface characteristics.

U.S. Pat. No. 5,304,927 discloses a method and apparatus for detection of metal in food products as packages of said food products are passed through the detector on a conveyor.

An exemplary embodiment of the present invention may therefore provide an improved method for operating a metal detection apparatus that uses one or more operating frequencies as well as a metal detection apparatus operating according to this method.

Particularly, an exemplary embodiment of the present invention may provide a metal detection apparatus that may easily, quickly, and with high precision be adapted for any coil system for a specific application.

More particularly, an exemplary method may allow for adjustment of the drive current applied to the transmitter coil with reduced effort and high precision.

Other advantages of exemplary embodiments of the present invention may allow for a method for operating a metal detection apparatus that comprises a transmitter unit with a drive circuit that alternately applies two different drive voltages via a first set of two drive switches to a first tail and via a second set of two drive switches to a second tail of a transmitter coil that is coupled to a receiver coil, which is connected to the input of a receiver unit.

According to an exemplary embodiment, at least a first waveform may be generated for controlling the first set of drive switches and at least a second waveform may be generated for controlling the second set of drive switches, wherein the first and second waveform that correspond to a selected operating frequency are shifted relative to one another in order to allow a desired drive current to flow through the transmitter coil.

According to an exemplary embodiment, a drive current may easily be generated for a selected operating frequency and with a level that may precisely be adjusted. Changes and adjustments may easily be performed so that the exemplary method may allow fast changes between different modes of operation. In an exemplary embodiment, the transmitter may be changed from operating with a first operating frequency and a first level of the drive current to a second operating frequency with a second level of the drive current. For example, the drive current may be adjusted in steps of a selectable resolution to a desired level practically within a clock cycle.

In order to obtain a required phase shift between the two waveforms in an exemplary embodiment, only one waveform needs to be shifted in phase. Preferably both waveforms are shifted in opposite directions relative to one another, in order to keep the phase of the drive current constant in an exemplary embodiment.

In an example, the two waveforms provided each for the first and the second set of drive switches are preferably phase shifted by 180° relative to one another. In an exemplary embodiment, each drive switch is controlled individually with a dedicated waveform. In this way, optimal control of the drive current may be obtained, and malfunctions may be avoided.

The waveforms may be shifted in steps having a step-length that preferably corresponds to the wavelength of the operating frequency divided by an integer n.

In an exemplary embodiment, segments of the polarity "0" or "1" corresponding to the waveforms may be shifted (e.g., preferably rotated in a shift register with a clock frequency that may be obtained by multiplying the integer n with the operating frequency so that the desired waveform is generated at the output of the shift registers).

In an exemplary embodiment, segments may be provided only for a half wave and may be inverted for the second half wave, thus allowing use of shorter shift registers. The segments exiting the shift registers may be applied to an inverter, which may provide segments with inverted polarity to the input of that shift register. Consequently, segments of the first half wave and the second half wave may be cycled in the shift register with the correct polarity.

Corresponding shift registers may be set up for a selected shift resolution and may be clocked with the clock frequency that corresponds to the operating frequency multiplied by integer n.

Said integer n may be selected according to the applied operating frequency so that for a lower operating frequency a higher shift resolution may be obtained and for a higher operating frequency a lower shift resolution may be obtained.

In one exemplary embodiment, the integer n is preferably selected in the range between 512 and 64 for operating frequencies in the range of 25 kHz and 250 kHz and in the range between 128 and 16 for operating frequencies in the range of 250 kHz and 1 MHz.

In exemplary embodiments, segments may be provided with such a polarity and number that a waveform with a duty cycle of 50% is represented.

In a further exemplary embodiment, steps and means may be provided, by which the closing of the first drive switch of a set of drive switches may be avoided as long as a second drive switch of this switch set is still closed, since closing of both drive switches may lead to a short-circuit between the two drive voltages. For example, this may be advantageously achieved by inverting at least the leading segment of a group of segments of a half cycle, for which a corresponding drive switch is closed, thus delaying activation of this drive switch for a corresponding time length. Inverting one or more segments provided in the shifted registers may be done with little effort. In an exemplary embodiment, the delay may correspond to the number of the inverted segments and their time length, which may correspond to a period of the clock frequency provided to the shift registers. In another exemplary embodiment, the delay may be obtained by using a counter, which in response to an input signal may provide an output signal after a predetermined number of clocks of the clock frequency have been counted. In an exemplary embodiment, the counter may be programmable so that for each operating frequency a predetermined number of clocks and thus a predetermined delay may be selected.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
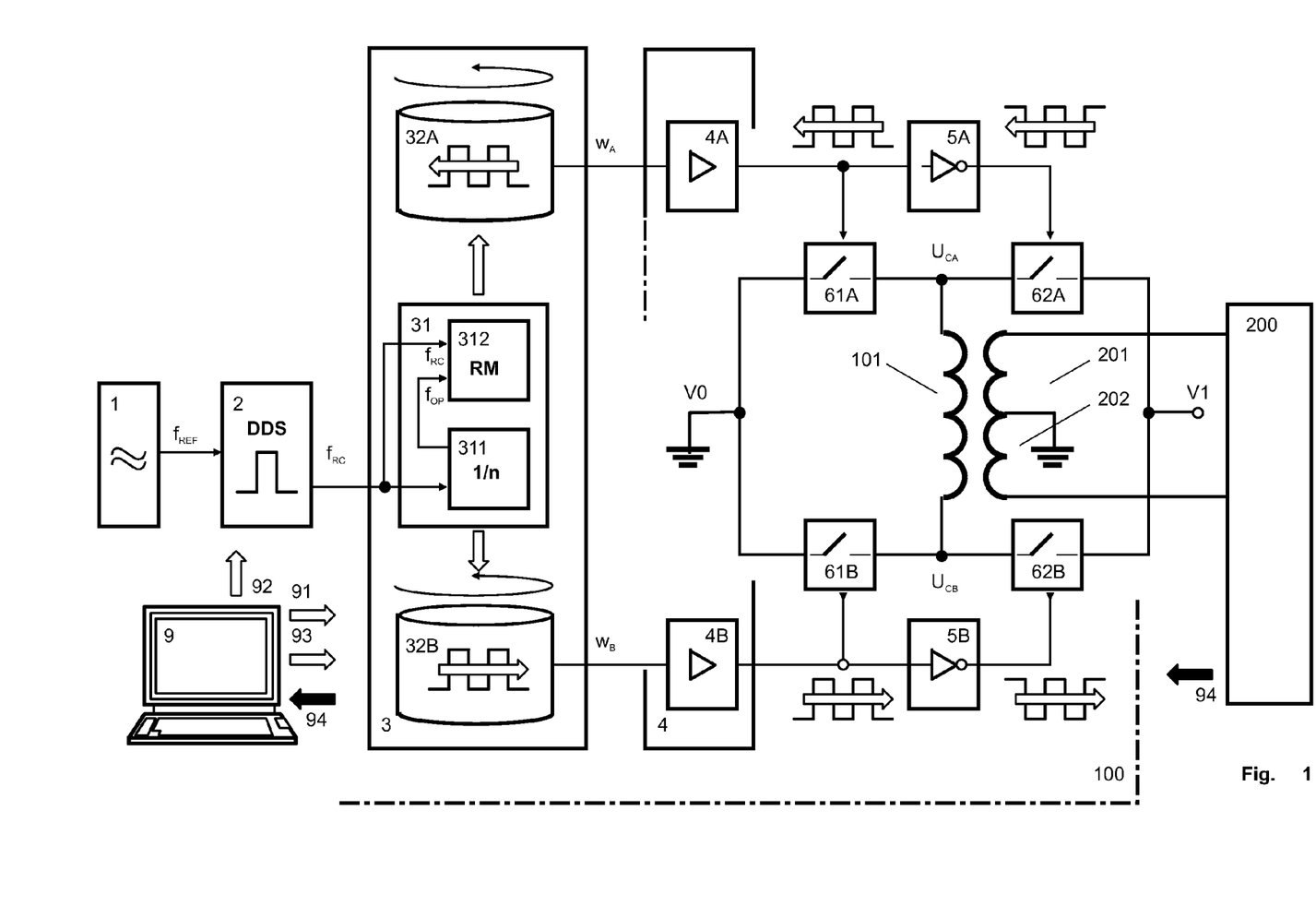
FIG. 1 is a block diagram of an exemplary embodiment of a metal detection apparatus that comprises a generator module 3 with at least two shift registers 32A, 32B used for controlling four drive switches 61A, 62A; 61B, 62B through which drive voltages V0, V1 are applied to a transmitter coil 101.

FIG. 1 shows a block diagram of an exemplary embodiment of a metal detection apparatus, which comprises a transmitter unit 100, a balanced coil system with a transmitter coil 101, a first and a second receiver coil 201, 202, a receiver unit 200 and a control unit 9 that comprises standard interfaces, input devices, and output devices, a keyboard, and a monitor. In an exemplary embodiment, signals that are received and processed during the operation of the metal detection apparatus are forwarded from the receiver unit 200 to the control unit 9, which further processes and displays the results of the measurement. The control unit 9 further controls the configuration and operation of the metal detection apparatus according to instructions entered by the user. Control signals are transferred via control lines or buses 91, 92, 93 to the different entities or modules of the transmitter unit 100 and the receiver unit 200 (see also FIG. 3). From the receiver unit 200, received and processed signals are forwarded via data bus 94 to the control unit 9, which further processes, displays, and/or stores the results of the measurement processes.

The transmitter unit 100 comprises a frequency generator 1, preferably a crystal oscillator that provides a reference frequency $f_{REF}$ to a frequency synthesizer 2, preferably a direct digital synthesizer, which delivers a clock frequency $f_{RC}$ to a generator module 3. In an exemplary embodiment, the clock frequency $f_{RC}$ is selected to be a multiple of the operating frequency $f_{OP}$ of the metal detection apparatus.

The generator module 3 generates two control voltages with waveforms $w_A$, $w_B$ that are forwarded via a common amplifier module 4 (see FIG. 3) or individual amplifier modules 4A, 4B and possibly two inverters 5A, 5B to a first set of drive switches 61A, 62A that are connected to one tail of a transmitter coil 101 and to a second set of drive switches 61B, 62B that are connected to the other tail of the transmitter coil 101. By the application of the control signals $w_A$, $w_B$ in an exemplary embodiment, the drive switches 61A, 62A; 61B, 62B of each drive set are alternately but never simultaneously connected to a first and to a second drive voltage V0 and V1, so that a short circuit is avoided. With the alternate connection of the drive voltages V0 and V1 to the tails of the transmitter coil 101, composite voltages $U_{CA}$ and $U_{CB}$ appear at both tails of the transmitter coil 101, which correspond to the waveforms $w_A$, $w_B$ of the control voltages provided by the generator module 3.

Figure 5A:
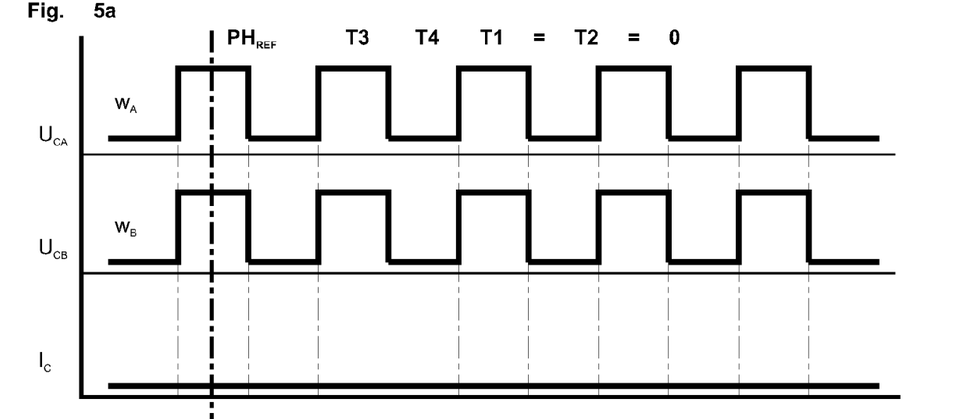
FIG. 5a is a diagram of composite voltages $U_{CA}$, $U_{CB}$ occurring in phase at the opposite tails of the transmitter coil 101 and the resulting drive current $I_c$, which is zero at this setting.
Figure 5B:
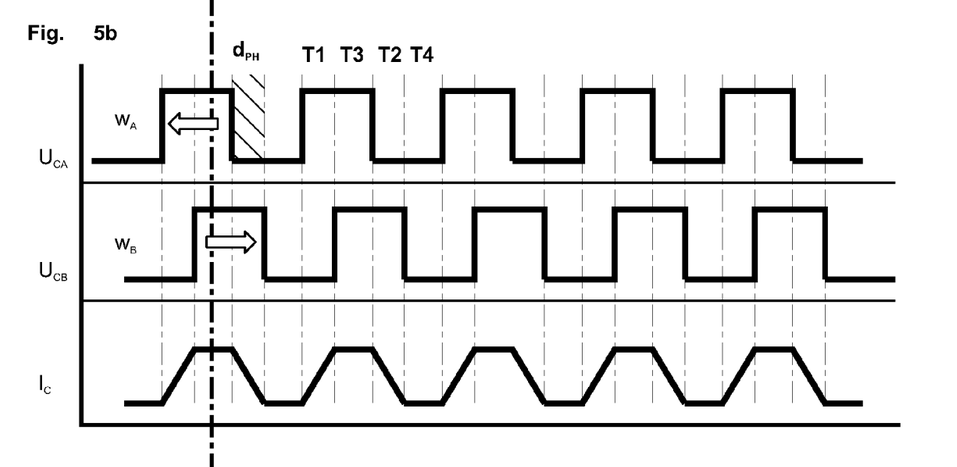
FIG. 5b is a diagram of the composite voltages $U_{CA}$, $U_{CB}$ occurring out of phase at the opposite tails of the transmitter coil 101 and the resulting drive current $I_c$.
Figure 5C:
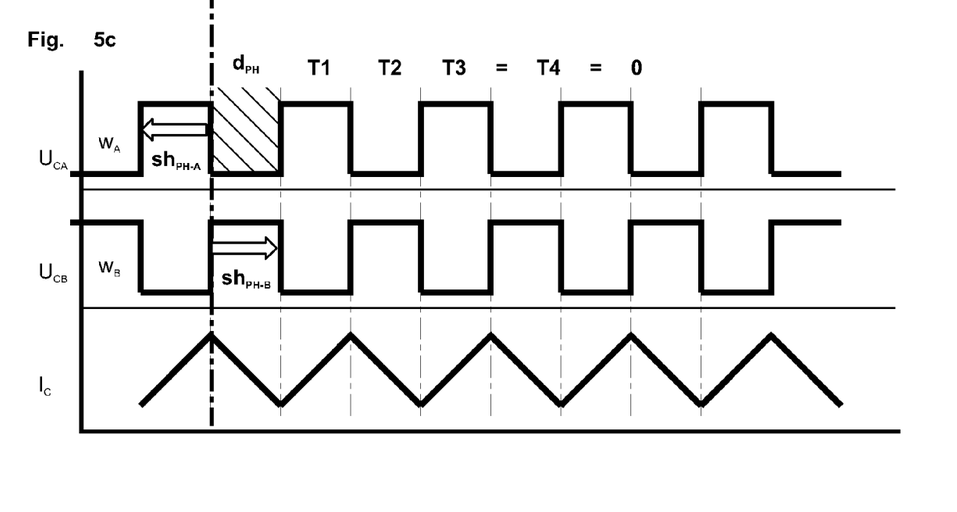
FIG. 5c is a diagram of the composite voltages $U_{CA}$, $U_{CB}$ occurring 180° out of phase at the opposite tails of the transmitter coil 101 and the resulting drive current $I_c$, which is at maximum value.

These composite voltages $U_{CA}$ and $U_{CB}$ are in phase as shown in FIG. 5a as long as the control voltages or waveforms $w_A$, $w_B$, are in phase, with the result that no drive current Ic is driven through the transmitter coil 101, since the difference of the two composite voltages $U_{CA}$ and $U_{CB}$ is zero. However, as soon as the waveforms $w_A$, $w_B$, and thus the composite voltages $U_{CA}$ and $U_{CB}$ are shifted relative to one another by a phase angle $d_{PH1}$ as shown in FIG. 5b, then drive currents Ic start flowing in the transmitter coil 101. During periods T1, T2, in which the composite voltages $U_{CA}$ and $U_{CB}$ exhibit a difference, drive currents Ic of opposite polarity are introduced into the transmitter coil 101. In periods T3, T4 when the composite voltages $U_{CA}$ and $U_{CB}$ do not exhibit a difference, then the drive current Ic introduced into the transmitter coil 101 circulates across the closed drive switches 61A and 61B or 62A and 62B. In the event that the waveforms $w_A$, $w_B$, and thus the composite voltages $U_{CA}$ and $U_{CB}$ are shifted relative to one another by a phase angle of 180° as shown in FIG. 5c, then drive currents Ic of opposite polarity are introduced into the transmitter coil 101 during time periods T1, T2 that are of maximal length, while the time periods T3 and T4 are zero.

In order to avoid a short-circuit between the drive voltages V1, V0, simultaneous closing of both drive switches 61A and 62A or 61B and 62B is avoided by means of inverters 5A and 5B. By this measure in an exemplary embodiment, it is ensured that the control voltages that the control input of the drive switches 61A and 62A or 61B and 62B are always of opposing polarity. By inverting the control voltages or waveforms $w_A$, $w_B$, that are applied to the second drive switch 62A, 62B of each switch set 61A, 62A or 61B, 62B, alternating application of the drive voltages V0, V1 is achieved. The drive voltages V0, V1 may be of identical value but opposite polarity. In the present example, the first drive voltage V0 is set to ground potential, while the second drive voltage V1 is set to a suitable value such as 24V.

As described above and shown in FIGS. 5a, 5b, and 5c, a suitable drive current Ic may precisely be adjusted by shifting the waveforms $w_A$, $w_B$ of the control signals relative to one another. Drive currents Ic will start to flow, when shifting one or the other waveform $w_A$, $w_B$.

However in exemplary embodiments, both waveforms $w_A$, $w_B$ are equally shifted relative to one another in opposite directions. As illustrated in FIG. 5c, equivalent phase shifts $sh_{PH-A}$ and $sh_{PH-B}$ are applied to both waveforms $w_A$, $w_B$, which correspond to the waveforms of the composite voltages $U_{CA}$ and $U_{CB}$. As a result of equally shifting the waveforms $w_A$, $w_B$ in opposite directions, the phase of the drive current Ic may remain constant when changing the level of the drive current Ic (see the reference line $PH_{REF}$ crossing FIGS. 5a, 5b, and 5c).

In an exemplary embodiment, the waveforms $w_A$, $w_B$ are generated and shifted in the generator module 3 with the help of correspondingly configured shift registers 32A, 32B. With this means, the task may be fulfilled efficiently without requiring costly signal processing means with which desirable waveforms could also be generated. The generator module 3 comprises a control module 31 which performs several tasks. With a divider module 311, the clock frequency $f_{RC}$ provided by the frequency synthesiser 2, preferably a direct digital synthesizer DDS, is divided by an integer n in order to obtain the operating frequency $f_{OP}$ of the metal detection apparatus.

When selecting the operating frequency $f_{OP}$, the control unit 9 sets the clock frequency $f_{RC}$ of the frequency synthesizer 2 to a value corresponding to the product of the multiplication of the operating frequency $f_{OP}$ times the integer n ($f_{RC}=f_{OP}*n$).

Figure 2A:
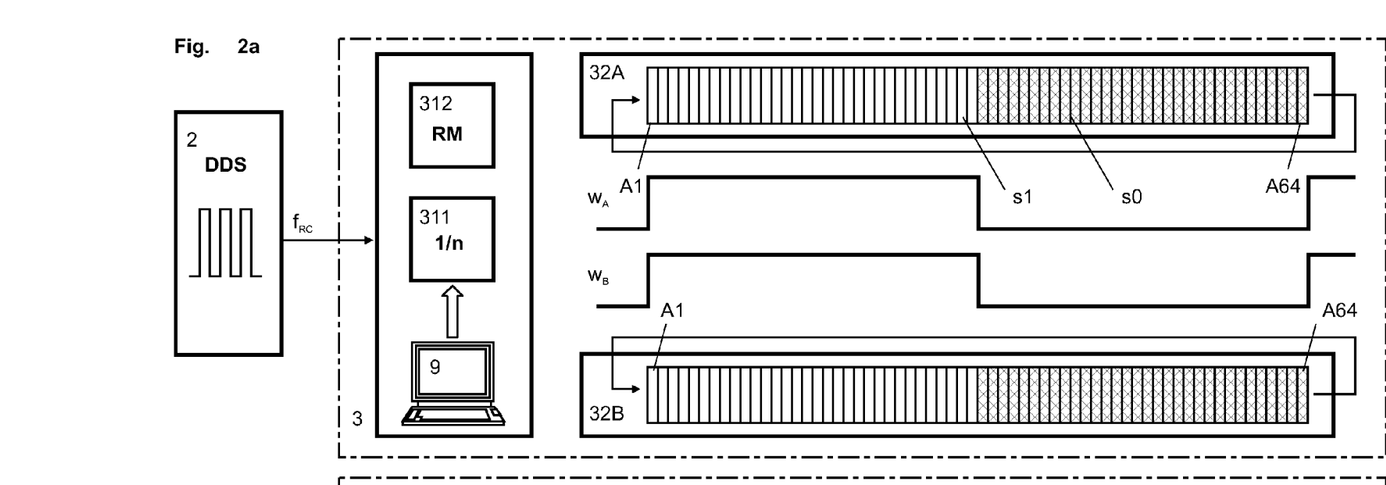
FIG. 2a is a schematic that shows the generator module 3 of FIG. 1 in an exemplary embodiment with the shift registers 32A, 32B filled with segments that represent waveforms $w_A$, $w_B$ aligned in phase.

The integer n is selected in such a way that the waveforms $w_A$, $w_B$ at the output of the generator module 3, which corresponds to the operating frequency $f_{OP}$, are divided into a number n of segments s1, s0 that are provided in the corresponding shift registers 32A, 32B as shown in FIG. 2a. Consequently, the clock frequency $f_{RC}$ is used as the clock for the shift registers 32A, 32B. With the number of n clock signals, a full wave of the waveforms $w_A$, $w_B$ is generated by the generator module 3. Hence, with the clock frequency $f_{RC}$ applied to the shift registers 32A, 32B and with the number n segments provided per full wave of the waveforms $w_A$, $w_B$, corresponding control signals are generated exhibiting the operating frequency $f_{OP}$.

The integer n therefore determines the resolution with which the waveforms $w_A$, $w_B$ are shifted and the resolution with which the drive current Ic may be adjusted.

In an exemplary embodiment, the integer n is selected according to the applied operating frequency $f_{OP}$ so that preferably for a lower operating frequency $f_{OP}$ a higher shift resolution is obtained and for a higher operating frequency $f_{OP}$ a lower shift resolution is obtained.

In one example, the integer n is preferably selected in the range between 512 and 64 for operating frequencies $f_{OP}$ in the range between 25 kHz and 250 kHz and in the range between 128 and 16 for operating frequencies $f_{OP}$ in the range between 250 kHz and 1 MHz.

For example, for the frequency band from 25 kHz to 28 kHz an integer n of 256, for the frequency band from 29 kHz to 250 kHz an integer n of 128, for the frequency band from 251 kHz to 500 kHz an integer n of 64, and for the frequency band from 501 kHz to 850 kHz an integer n of 32 may advantageously be applied.

In FIG. 2a, two shift registers 32A and 32B have been created with a bit length of 64 bits that have been filled with 32 segments s1 having a polarity "1" and 32 segments s0 having a polarity "0". In both shift registers 32A, 32B, the segments s1 with the polarity "1" are located at addresses A1 to A32 and the segments s0 with the polarity "0" are located at addresses A33 to A64. Consequently the waveforms that are generated, i.e., that are leaving the shift registers 32A, 32B, are in phase. The composite voltages $U_{CA}$ and $U_{CB}$ are in phase, and the drive current Ic through the transmitter coil 101 remains zero.

Figure 2B:
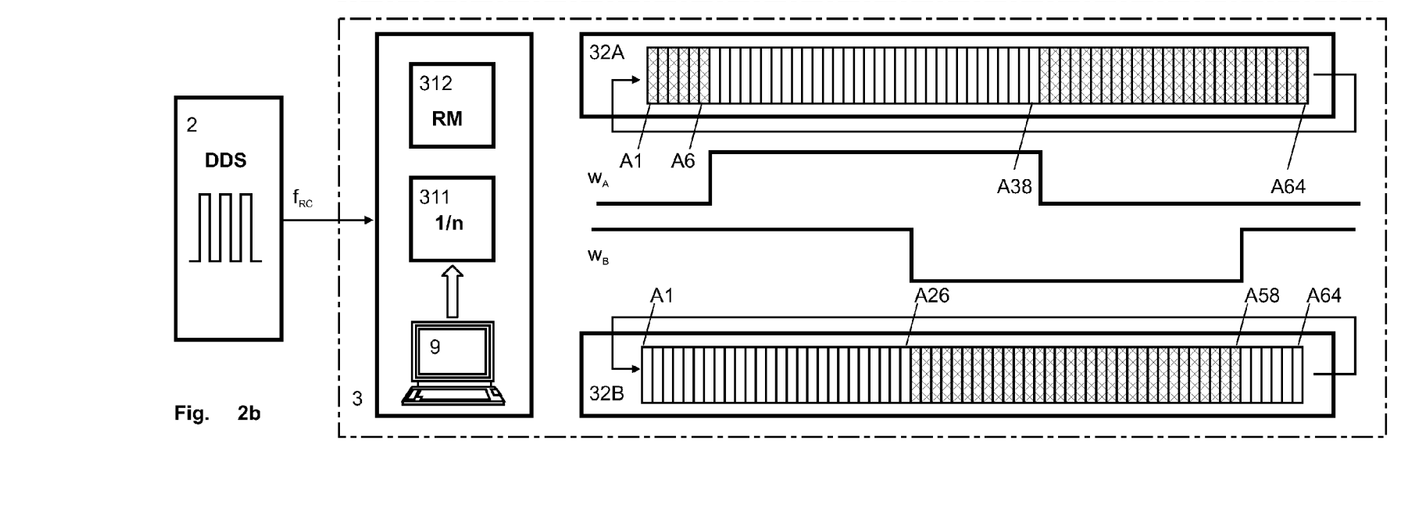
FIG. 2b is a schematic that shows the generator module 3 of FIG. 1 in an exemplary embodiment with the shift registers 32A, 32B filled with segments that represent waveforms $w_A$, $w_B$ that are both shifted in phase relative to one another in opposite directions.

In FIG. 2b, the segments s1, s0 in the first shift register 32A have been shifted by six segments s1, s0 to the right, and the segments s1, s0 in the second shift register 32B have been shifted by six segments s1, s0 to the left. At the addresses A1-A6 and A39-A64 of the first shift register 32A, segments s0 with the polarity "0" are provided, while at the addresses A7-A38 segments s1 with the polarity "1" are provided. At the addresses A1-A26 and A59-A64 of the second shift register 32B, segments s1 with the polarity "1" are provided, while at the addresses A27-A58 segments s0 with the polarity "0" are provided. As further shown in FIG. 2b resulting waveforms $w_A$, $w_B$ are generated that are shifted in opposite directions relative to one another, causing the corresponding drive current Ic to flow in the transmitter coil 101.

In this exemplary embodiment, the segments s1, s0 are circulated in the shift registers 32A, 32B. Hence, segments s1, s0 leaving the output of the shift registers 32A, 32B are sequentially forwarded to the input of the shift registers 32A, 32B and thus circulated.

In order to adjust a desired drive current Ic with the required step resolution, shift registers 32A, 32B are set up with a bit length corresponding to selected integer n and are filled with segments s1, s0 that they are shifted against one another such as may be required or as shown as an example in FIG. 2b.

In this embodiment, this task is performed by a management module 312 provided for the management of setting up and modifying the shift registers 32A, 32B according to the selected integer n and the desired drive current Ic.

In order to use shift registers 32A, 32B with reduced bit lengths, the number n/2 of segments s1, s0 representing only a half cycle of the waveforms $w_A$, $w_B$ may be provided and circulated in the shift registers 32A, 32B in such a way that each segment s1, s0 that is emitted at the output is inverted or converted into a segment s0, s1 of opposite polarity before it is applied to the input of the shift registers 32A, 32B. In this way, a complete waveform may be circulated in the registers 32A, 32B that however are only half in length.

Figure 3:
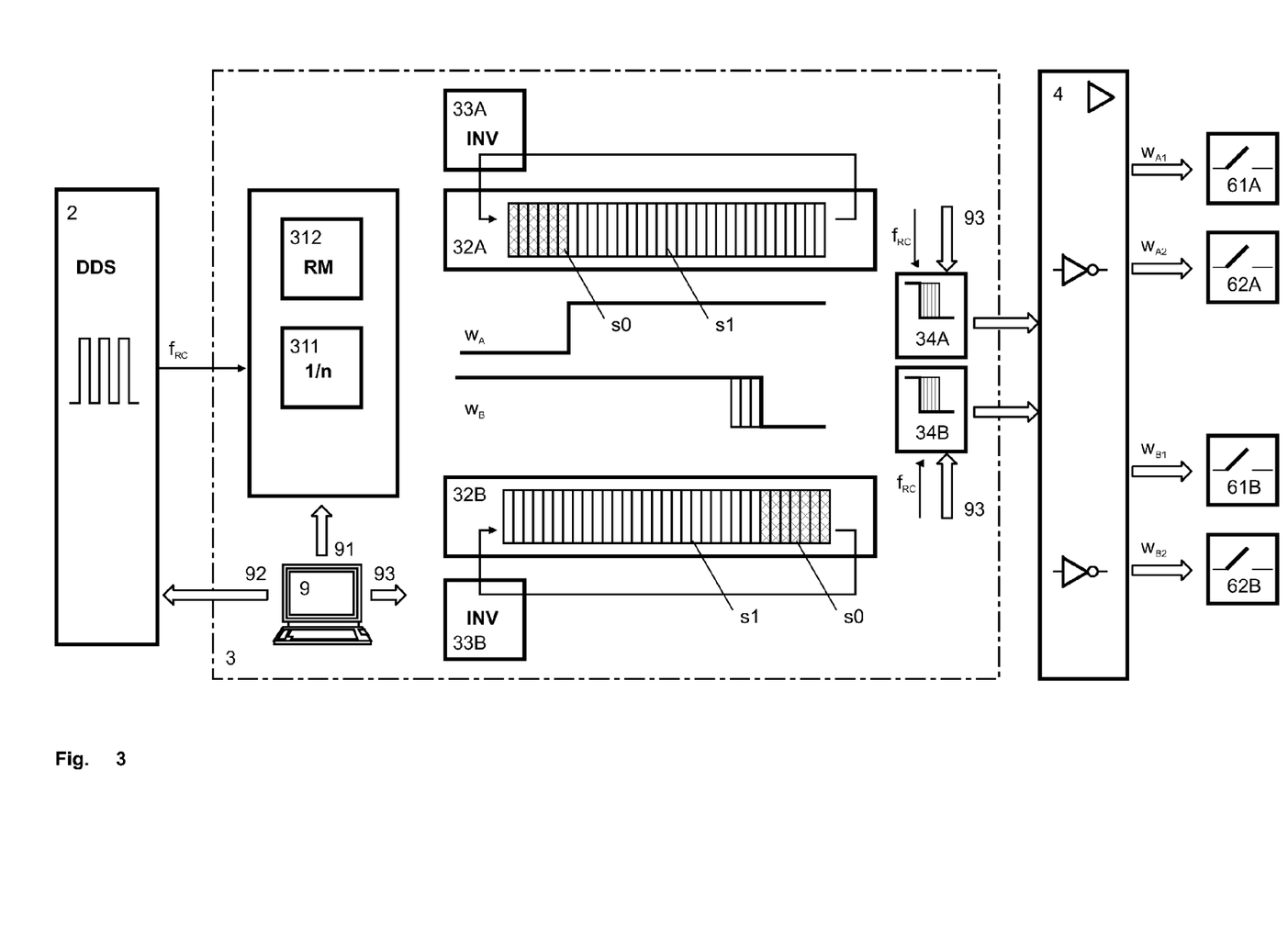
FIG. 3 is a schematic that shows the generator module 3 of FIG. 1 in an exemplary embodiment with the shift registers 32A, 32B filled with segments that represent only a half wave of the waveforms $w_A$, $w_B$ and that are inverted each turn when circulating in the registers 32A, 32B.

As shown in the example of FIG. 3, the segments s1, s0 leaving the output of the shift registers 32A, 32B are applied to inverters 33A, 33B before they are applied to the input of the shift registers 32A, 32B. The segments s1, s0 leaving the output of the shift registers 32A, 32B are also forwarded to the input of an amplifier module 4, which amplifies or inverts and amplifies the received segments in order to generate waveforms of individual control signals $w_{A1}$, $w_{A2}$, $w_{B1}$, $w_{B2}$ for each drive switch 61A, 62A, 61B, 62B.

In order to prevent the drive switches 61A, 62A or 61B, 62B on either side of the transmitter coil 101 turning on at the same time and shorting the drive voltage V0 and V1, a delay, preferably based on the clock frequency provided by the frequency generator 1, is provided, with which switching on of the drive switches 61A, 62A or 61B, 62B may be delayed. In an exemplary embodiment, this delay preferably corresponds to the characteristics of the drive switches 61A, 62A, 61B, 62B, namely the turn off delay and the fall time when input is removed. Hence, with the delay it may be ensured that a respective drive switch 61A, 62A, 61B, 62B is completely switched off before a neighboring respective drive switch 61A, 62A, 61B, 62B is turned on.

For example, switching on the drive switches 61A, 62A, 61B, 62B may be delayed by five clock pulses of the clock frequency. At an operating frequency of 850 kHz and a shift register length of 32 bits, the clock frequency would be 27.2 MHz. With the length of one clock period of 36.8 ns at this frequency, the resulting delay of five clock periods would then be 184 ns.

With an operating frequency of 25 kHz and a shift register length of 256 bit, the delay time resulting from five clock periods would be 781 ns, which may be too long in an exemplary embodiment. In order to maintain the delay close to a suitable delay of approximately 180 ns for typical power MOSFET switches in an exemplary embodiment, a multiple of the clock frequency may be provided by the frequency generator 1 providing shorter clock periods with which the delay may be selected.

In an exemplary embodiment, a desired delay may be implemented with hardware circuitry or software.

FIG. 3 shows an example of the generator module 3 with two delay modules 34A and 34B, which respectively delay the rising edge of a control signal $w_{A1}$, $w_{A2}$, $w_{B1}$, $w_{B2}$ by a selectable number of clock periods of the clock frequency $f_{RC}$. The delay circuits 34A and 34B preferably comprise a counter, which counts clock cycles and which provides an output signal after a predetermined number of clock cycles has been counted. The delay modules 34A and 34B may be hardware modules or software modules.

Figure 4:
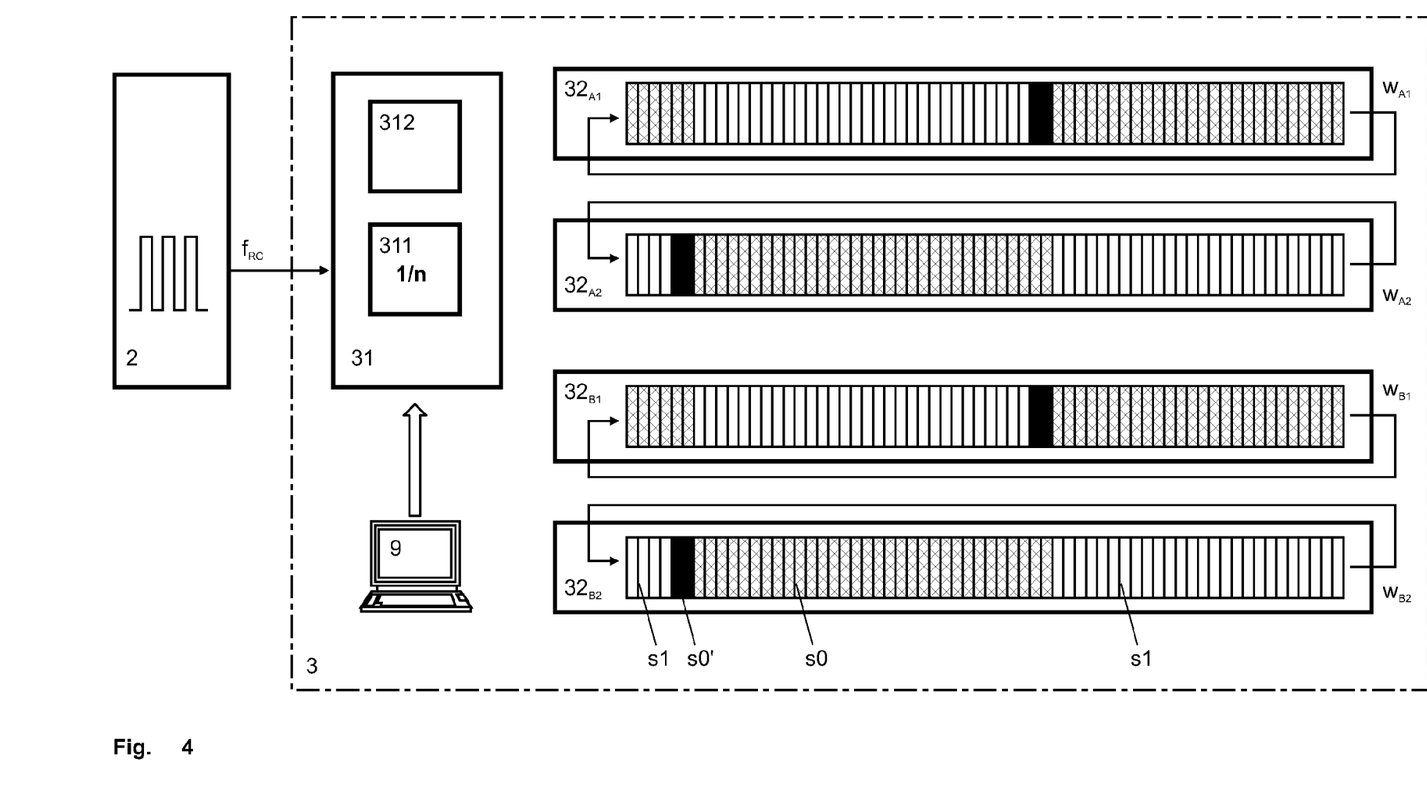
FIG. 4 is a schematic that shows the generator module 3 of FIG. 1 in a further exemplary embodiment with a shift register $32_{A1}$; $32_{A2}$; $32_{B1}$; $32_{B2}$ assigned to every drive switch 61A, 62B; 61B, 62B.

FIG. 4 shows the generator module 3 of FIG. 1 in a further exemplary embodiment with shift registers $32_{A1}$, $32_{A2}$, $32_{B1}$, $32_{B2}$ assigned to every drive switch 61A, 62A, 61B, 62B. In this embodiment, the delay is obtained by means of software provided in the management module 312 that is controlling the shift registers $32_{A1}$, $32_{A2}$, $32_{B1}$, $32_{B2}$. It is shown that, except for the segments s0' shown in black, the segments s1, s0 in the shift registers $32_{A1}$, $32_{A2}$ and the shift registers $32_{B1}$, $32_{B2}$ are of opposite polarity at the corresponding addresses. Consequently, only one of the drive switches of a respective switch set 61A, 62A or 61B, 62B may be closed at a time. In this example, the two leading segments s0' of the group of segments s1 with the polarity "1" that would activate a drive switch 61A, 62A, 61B, 62B, however, have been reset to the opposite polarity, thus preventing activation of the corresponding drive switch 61A, 62A, 61B, 62B with the arrival of the first segment of the group of segments s1. Hence, activating a drive switch 61A, 62A, 61B, 62B may be delayed by a selectable number of segments s0' in order to avoid a connection between the two drive voltages V0, V1 during transition processes.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for operating a metal detection apparatus comprising a transmitter unit with a drive circuit that alternately applies two different drive voltages via a first set of two drive switches to a first tail and via a second set of two drive switches to a second tail of a transmitter coil that is coupled to a receiver coil, which is connected to the input of a receiver unit, said method comprising:
   generating at least a first waveform for controlling the first set of drive switches and at least a second waveform for controlling the second set of drive switches;
   wherein the first waveform and the second waveform that correspond to a selected operating frequency are shifted relative to one another in order to allow a desired drive current to flow through the transmitter coil.

2. The method according to claim 1, wherein one of the first waveform and the second waveform is shifted relative to the other of the first waveform and the second waveform.

3. The method according to claim 1, wherein both the first waveform and the second waveform are shifted in opposite directions relative to one another.

4. The method according to claim 1, wherein for control of each of the drive switches an individual waveform is generated such that the individual waveforms provided for the first and the second set of drive switches are phase shifted by 180° relative to one another.

5. The method according to claim 1, wherein for control of each of the drive switches an individual waveform is generated that is adapted to control the related drive switch individually.

6. The method according to claim 1, wherein the first waveform and/or the second waveform are shifted in steps having a length that corresponds to a wavelength of the operating frequency divided by an integer n.

7. The method according to claim 6, wherein segments of the polarity "0" or "1" corresponding to the first and second waveforms, or individual waveforms for control of the drive switches, are shifted.

8. The method according to claim 7, wherein the segments are rotated in shift registers with a clock frequency that is obtained by multiplying the integer n with the operating frequency so that a desired waveform is generated at an output of a respective shift register.

9. The method according to claim 8, wherein the polarity of the segments is inverted for a half cycle of the first and second waveforms or the individual waveforms for control of the drive switches, thus allowing use of shorter shift registers that are provided with only a half wave of the first and second waveforms or the individual waveforms for control of the drive switches.

10. The method according to claim 6, furthering comprising the step of inhibiting a respective drive switch of each switch set from being closed as long as the other respective drive switch of the same switch set is closed.

11. The method according to claim 7, wherein a leading edge of a respective one of the first and second waveforms, or the individual waveforms for control of the drive switches, that is adapted to close a respective drive switch is delayed until the other respective drive switch of the same switch set is switched off.

12. The method according to claim 11, wherein the delay is facilitated by a programmable counter with a selectable number of clock pulses.

13. The method of claim 11, wherein at least a leading one of the segments of a half cycle, for which a respective drive switch is closed, is inverted in polarity thus delaying activation of the respective drive switch for a corresponding time length.

14. The method according to claim 6, wherein the integer n is selected according to the operating frequency so that for a lower operating frequency a higher shift resolution is obtained and for a higher operating frequency a lower shift resolution is obtained.

15. The method according to claim 14, wherein:
   the integer n is selected in the range between 512 and 64 for operating frequencies in the range of 25 kHz and 250 kHz; and
   the integer n is selected in the range between 128 and 16 for operating frequencies in the range of 250 kHz and 1 MHz.

16. A metal detection apparatus comprising:
   a transmitter unit with a frequency source and a drive circuit that is adapted to alternately apply two different drive voltages via a first set of two drive switches to a first tail and via a second set of two drive switches to a second tail of a transmitter coil that is coupled to a receiver coil, which is connected to an input of a receiver unit; and
   a generator module, which is connected to the frequency source, adapted to generate at least a first waveform for controlling the first set of drive switches or each drive switch of the first set of drive switches and at least a second waveform for controlling the second set of drive switches or each drive switch of the second set of drive switches, and adapted to shift the first and second waveforms that correspond to a selected operating frequency relative to one another in order to allow a drive current to flow through the transmitter coil.

17. The metal detection apparatus according to claim 16, wherein for each of the first and second waveforms or individual waveforms for control of the drive switches, further comprising a shift register that is filled with a number n or n/2 segments of a respective one of the first and second waveforms or the individual waveforms for control of the drive switches, said segments constituting a full wave or a half wave and being circled or inverted and circled in said shift register with a clock frequency that is n times higher than the operating frequency.

18. The metal detection apparatus according to claim 16, wherein the operating frequency is adapted to correspond to a frequency of the frequency source.

19. The metal detection apparatus according to claim 16, further comprising means for inhibiting a respective drive switch of each switch set from being closed as long as the other respective drive switch of the same switch set is still closed.

20. The metal detection apparatus according to claim 17, wherein:
the shift registers are filled with a number x of the segments of a polarity "1" and with a number y of the segments of a polarity "0", such that the numbers x and y are adapted to be selected in such a way that at least a leading one of the segments of a half cycle, for which a respective drive switch is closed, is inverted in polarity thus delaying activation of the respective drive switch for a corresponding time length.

* * * * *

UNITED STATES PATENT AND TRADEMARK OFFICE
CERTIFICATE OF CORRECTION

| | | |
|---|---|---|
| PATENT NO. | : 9,018,935 B2 | Page 1 of 1 |
| APPLICATION NO. | : 13/236275 | |
| DATED | : April 28, 2015 | |
| INVENTOR(S) | : McAdam | |

It is certified that error appears in the above-identified patent and that said Letters Patent is hereby corrected as shown below:

On the title page, in line 14 of item (57) Abstract, please delete "current to" and insert
-- current $I_C$ to --.

Signed and Sealed this
First Day of September, 2015

Michelle K. Lee
*Director of the United States Patent and Trademark Office*